(12) United States Patent
Eriksson

(10) Patent No.: US 8,537,804 B2
(45) Date of Patent: Sep. 17, 2013

(54) PREFIX DELEGATION IN A COMMUNICATION NETWORK

(75) Inventor: Anders Eriksson, Kista (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 261 days.

(21) Appl. No.: 13/057,264

(22) PCT Filed: Aug. 29, 2008

(86) PCT No.: PCT/EP2008/061426

§ 371 (c)(1),
(2), (4) Date: Feb. 2, 2011

(87) PCT Pub. No.: WO2010/022793

PCT Pub. Date: Mar. 4, 2010

(65) Prior Publication Data

US 2011/0141945 A1    Jun. 16, 2011

(51) Int. Cl.
*H04L 12/28* (2006.01)
(52) U.S. Cl.
USPC ............ 370/351; 370/392; 709/228; 709/229
(58) Field of Classification Search
USPC ................. 370/217, 216, 221, 228, 231, 237, 370/254, 392, 315, 351, 401; 709/228, 229, 709/238
See application file for complete search history.

(56) References Cited

U.S. PATENT DOCUMENTS

| | | | |
|---|---|---|---|
| 7,567,547 B2 * | 7/2009 | Mosko et al. | 370/351 |
| 7,924,745 B2 * | 4/2011 | Hirano et al. | 370/254 |
| 7,957,289 B2 * | 6/2011 | Sundt et al. | 370/235 |
| 8,174,967 B2 * | 5/2012 | Sundt et al. | 370/221 |
| 8,243,603 B2 * | 8/2012 | Gossain et al. | 370/237 |
| 2002/0124090 A1 * | 9/2002 | Poier et al. | 709/228 |
| 2003/0212662 A1 * | 11/2003 | Shin et al. | 707/2 |
| 2005/0265259 A1 | 12/2005 | Thubert et al. | |
| 2006/0149853 A1 * | 7/2006 | Shankara | 709/238 |
| 2006/0165025 A1 * | 7/2006 | Singh et al. | 370/315 |
| 2007/0217419 A1 * | 9/2007 | Vasseur | 370/392 |
| 2008/0250045 A1 * | 10/2008 | Balassanian et al. | 707/101 |

FOREIGN PATENT DOCUMENTS

WO    WO 2005/076579 A1    8/2005

OTHER PUBLICATIONS

International Search Report, PCT Application No. PCT/EP2008/061426, Jul. 24, 2009.
Written Opinion, PCT Application No. PCT/EP2008/061426, Jul. 24, 2009.

(Continued)

*Primary Examiner* — Hassan Phillips
*Assistant Examiner* — Ajay Cattungal
(74) *Attorney, Agent, or Firm* — Myers Bigel Sibley & Sajovec, P.A.

(57) ABSTRACT

A method and apparatus for automated prefix delegation for a network entity in a communication network. A network entity receives from a first neighboring network entity a first prefix that relate to the first neighboring network entity, and a path length to a core network entity via the first neighboring network entity. The network entity also receives from a second neighboring network entity a second prefix that relates to the second neighboring network entity, and a path length to a core network entity via the second neighboring network entity. The network entity then selects a neighboring network entity on the basis of the path length to the core network entity, and delegates a prefix for the network entity by concatenating the prefix of the selected neighboring network entity with an identifier for the network entity.

15 Claims, 6 Drawing Sheets

(56) References Cited

OTHER PUBLICATIONS

Eriksson et al., "Dynamic Internetworking Based on Late Locator Construction", *IEEE Global Internet Symposium 2007*, pp. 67-71, retrieved Jan. 1, 2007 from the Internet: URL:http://www.ieeexplore.ieee.orq/1e15/4301417/4301418/04301433.pdf.

Botham et al., "Inter-Network Routing in Ambient Networks", *Proceedings of Mobile and Wireless Communications Summit, 2007*, retrieved Apr. 27, 2009 from the Internet: URL:http:www.ieeexplore.ieee.org/stamp/stamp.jsp?tp=&arnumber=4299145&isnumber=4299029.

* cited by examiner

PREFIX DELEGATION IN A COMMUNICATION NETWORK

CROSS REFERENCE TO RELATED APPLICATION

This application is a 35 U.S.C. §371 national stage application of PCT International Application No. PCT/EP2008/061426, filed on 29 Aug. 2008, the disclosure and content of which is incorporated by reference herein in its entirety. The above-referenced PCT International Application was published in the English language as International Publication No. WO 2010/022793 A1 on 4 Mar. 2010.

TECHNICAL FIELD

The invention relates to the field of prefix delegation in a communication network.

BACKGROUND

Prefix delegation is used to assign a network address prefix to a host such as a user site, and is described in S. Miyakawa, R. Droms, "Requirements for IPv6 Prefix Delegation", RFC 3769, June 2004. When configuring an IP network, IP prefixes are delegated down the network hierarchy using manual methods. It would be advantageous to automated prefix delegation in order to reduce network management costs, and also to support network mobility by allowing for automatic delegation of prefixes to a moving network that attaches to a parent network. Automated prefix delegation technology has not been deployed widely yet, even though a number of proposals have been brought forward, for example in US 2003/0182445 A1, WO 2007/149025 A1 and US 2006/0013193 A1. However, the mechanisms described in those proposals do not address the problem of arbitrary edge network topologies with many hierarchical levels.

Consider, for example, a network N levels down in a hierarchy of edge networks, where each network is attached to M parent networks. This network has $M^N$ different paths to the core network. Potentially, a network can have as many prefixes as there are different paths to the core network, since prefixes can be delegated along each of the paths. However, each network only needs a few of the $M^N$ paths, the exact number depending on the degree of multi-homing that is needed in order to provide sufficient redundancy to ensure that network can be reached in the event of failure of other networks on one of the paths to the network. There is therefore a need for criteria and mechanisms to select the best paths and the associated prefixes in order to reach the network. The best path is defined according to a specific policy routing criterion such as the QoS, the capabilities, or the cost of the path. It should be noted that since each prefix is associated with a specific path to the core network, the prefix selection implies a routing decision.

Prefix selection criteria based on the nearest prefix delegation server, or round-trip time to this server, are described in US 2003/0182445 A1. However, these criteria are not sufficient for the automated assignment and selection of prefixes across the edge topology based on general policy routing rules such as QoS, security, or cost. US 2003/0182445 A1 does not include a mechanism for coupling between prefix delegation and policy routing. In fact, policy routing is largely beyond the scope of US 2003/0182445 A1. Moreover, US 2003/0182445 A1 is based on a centralized prefix server, which is a single point of failure. In addition, there are scalability issues associated with a centralized prefix server, since it may need a capacity upgrade as the network grows.

SUMMARY

The inventor has realised the problems associated with automated prefix delegation in circumstances where a path to a network entity for which prefix delegation is required must traverse an arbitrary edge network topology with several hierarchical levels. A path is determined that fulfils specific policy criteria from a core network to the network entity across an arbitrary edge topology. Edge networks may be fixed or mobile, and single-homed or multi-homed. Prefixes are allocated recursively along each path on a per-network hop basis. The destination may be reached via a separate path for each policy class, and each path corresponds to a specific prefix.

According to a first aspect of the invention, there is provided a method of automated prefix delegation for a network entity in a communication network. A network entity receives from a first neighbouring network entity a first prefix that relate to the first neighbouring network entity, and a path length to a core network entity via the first neighbouring network entity. The network entity receives from a second neighbouring network entity a second prefix that relates to the second neighbouring network entity, and a path length to a core network entity via the second neighbouring network entity. The network entity then selects a neighbouring network entity on the basis of the path length to the core network entity, and delegates a prefix for the network entity by concatenating the prefix of the selected neighbouring network entity with an identifier for the network entity.

As an option, the delegated prefix for the network entity is sent a core network node.

Optionally, a path length from the network entity to the core network entity is calculated, and the delegated prefix and calculated path length are sent to a further neighbouring network.

The method optionally comprise receiving at the network entity from one of the first and second neighbouring network entities information relating to properties of the neighbouring network entity, and selecting a neighbouring network entity on the basis of the received information. This allows a network path to traverse entities having predetermined properties to be selected. For example the information relating to properties is optionally selected from any of capabilities of the neighbouring network entity, security policies used by the neighbouring network entity, Quality of Service policies used by the neighbouring network entity, and charges associated with the neighbouring network entity. The capabilities of the neighbouring network entity are optionally selected from any of encryption, decryption, admission control, transcoding, packet classification and filtering, address translation, proxy functions, cache functions, application layer gateway functions, firewall functions, and packet marking and scheduling capabilities.

The neighbouring entity is optionally selected on the basis that a path from the network entity to the core network entity traverses either at least one of, all of, or none of the network entities having predetermined properties.

The delegated prefix optionally comprises a concatenation of identifiers for each network entity in a path between the network entity and a prefix of the core network entity. Each individual prefix is optionally stored in an Attachment Register at an Attachment Register function, the individual prefixes being individually updatable in the event that the prefix for the associated network entity changes. This allows individual prefixes to change without affecting prefixes for all other network entities whose prefixes use the network entity individual prefix.

The network entity is optionally selected from any of a source host, a destination host, and an edge network.

According to a second aspect of the invention, there is provided a network entity for use in a communication network. The network entity is provided with a receiver for receiving from a first neighbouring network entity a first prefix, the first prefix relating to the first neighbouring network entity, and a path length to a core network entity via the first neighbouring network entity. The receiver is further arranged to receive from a second neighbouring network entity a second prefix, the second prefix relating to the second neighbouring network entity, and a path length to a core network entity via the second neighbouring network entity. A processor is provided for selecting a neighbouring network entity on the basis of the path length and delegating a prefix for the network entity by concatenating the prefix of the selected neighbouring network entity with an identifier for the network entity. A first transmitter is provided for sending to a core network node the delegated prefix for the network entity.

The network entity optionally comprises a second transmitter for advertising the delegated prefix and a path length to the core network node to further neighbouring network entities.

According to a third aspect of the invention, there is provided a Rendezvous System node for use in a communication network. The Rendezvous System node is provided with a first receiver for receiving a registration message from a network entity. The registration message includes a delegated prefix for the network entity, and the delegated prefix comprises a concatenation of identifiers for network entities in a path between the network entity and a core network entity and a prefix of the core network entity. A memory is provided for storing the delegated prefix for the network entity, and a second receiver is provided for receiving, from a requesting network entity, a request for the prefix of the network entity. A processor is arranged for determining, from the memory, the prefix of the network entity, and a transmitter is provided for sending a message to the requesting network entity, the message including the delegated prefix.

Optionally, an individual prefix for each network entity is individually updatable in the event that the prefix for that network entity changes.

According to a fourth aspect of the invention, there is provided a program for controlling a network entity to perform the method described for the first aspect of the invention. The program is optionally carried on a carrier medium, and the carrier medium is optionally a storage medium or a transmission medium.

According to a fifth aspect of the invention, there is provided a storage medium containing a program described in the fourth aspect of the invention.

DETAILED DESCRIPTION

The following description uses the term "network entity". Non-limiting examples of a network entity include a host, a terminal, an edge router and a proxy node for a non-network object.

Figure 1:
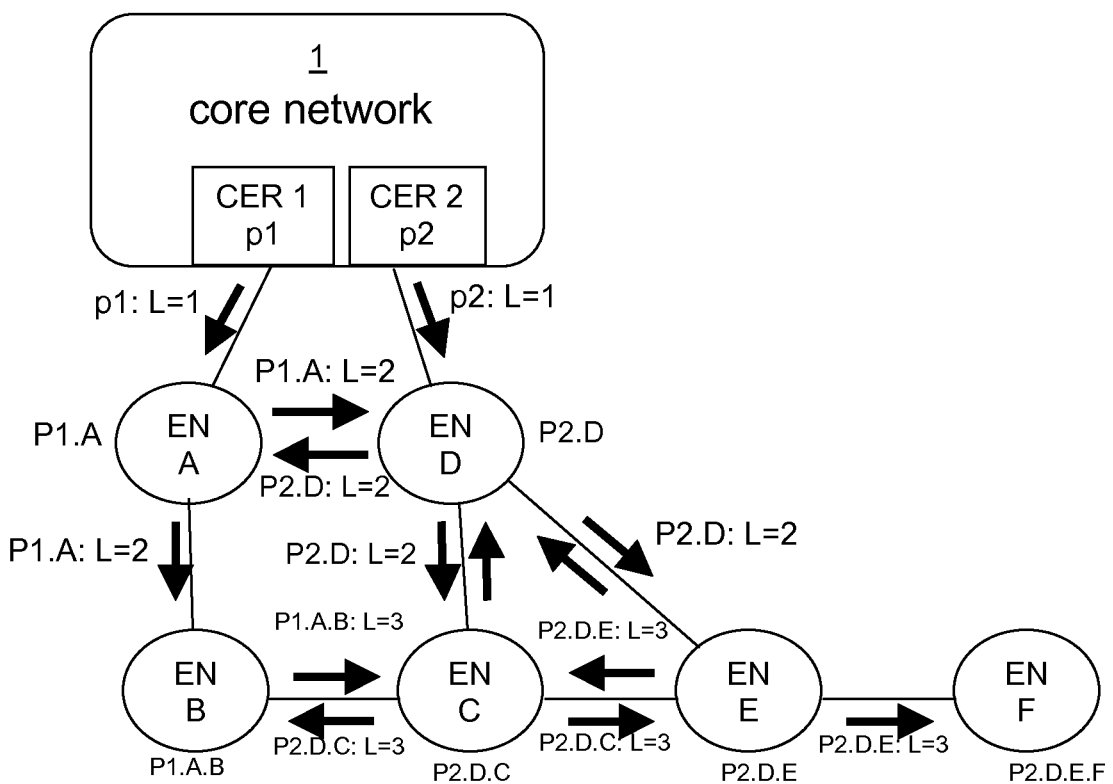
FIG. 1 illustrates schematically in a block diagram a network architecture and distance vector routing combined with automated prefix delegation according to an embodiment of the invention.

A network scenario with a core network 1 and a set of edge networks A to F (EN A, EN B etc.) forming an arbitrary edge topology is illustrated in FIG. 1. An edge network receives prefix advertisements from neighbouring networks, and accepts a prefix that is associated with a path with the shortest distance to the core network. The distance to the core network 1 is advertised by a routing protocol, such as a distance vector routing protocol, and the prefix advertisement messages are integrated with the routing advertisements. Different policy classes can be associated with different paths having different prefixes. A separate distance vector metric for each policy class is included in the routing advertisements.

FIG. 1 shows the signalling of a distance vector routing protocol that advertises the path length to the core network. The path length can be defined by a distance metric, such as the number of hops. When a core edge router (CER) or an edge network (EN) sends a routing advertisement, it advertises both its prefix and the distance to the core network. The advertisement is sent to the directly attached neighbours only.

An edge network receives advertisements of path lengths and prefixes from several different neighbouring edge networks or core edge routers, and selects the prefix associated with the shortest path to the core network. The edge network uses the selected prefix when it constructs its own prefix by appending an identifier. FIG. 1 shows an example where EN A receives a routing advertisement from Core Edge Router 1 (CER 1), with prefix p1 and a distance to the core network expressed as a hop count of one (L=1 in the figure). EN A forms its own prefix by adding its own identifier A to the prefix, resulting in a prefix of p1.A, as shown in FIG. 1 next to EN A.

After constructing its own prefix p1.A, EN A sends further advertisements to neighbouring networks. EN A therefore thus advertises its own prefix p1.A. In addition, EN A increments the hop count by one before advertising it to its neighbour networks (in this example, EN B and EN D). A network typically does not send an advertisement to the network from which it received the prefix that it used when constructing its own prefix. In this example, EN A advertises a distance to the core network of two hops (L=2 in the figure), and this advertisement is integrated with the prefix advertisement of EN A, which is p1.A. EN A sends the integrated advertisement including "P1.A: L=2" to EN B and EN D.

EN B and EN D in turn repeat this procedure by forming their own prefixes, updating the distance to the core network, and advertising the prefixes and the distance to their respective neighbours. EN B receives an advertisement with a hop count of L=2 from EN A, and a hop count of L=3 from EN C. EN B thus determines that the shortest path to the core network goes via EN A, and therefore forms the EN B prefix P1.A.B. Likewise, EN D receives advertisements from core edge router 2, EN A, EN C, and EN E. The advertisement with the shortest distance (hop count L=1) is received from core edge router 2. EN D thus determines that the shortest path to the core network goes via core edge router 2, and therefore forms the EN D prefix P2.D.

This prefix delegation and routing advertisement procedure proceeds until all network entities have been reached. As a result, all edge networks are assigned one hierarchical prefix as shown in FIG. 1. Each prefix of an edge network describes the shortest path between the edge network and the core network.

Network entity locators are formed by appending a network entity ID or a network entity interface ID to the prefix that is advertised by the EN to which the network entity is attached. For example, a network entity having an identity of H1, attached to EN F shown in FIG. 1, would have the locator p2.D.E.F.H1. Note that it would not be given locator p1.A.B.C.E.F.H1 because this has a longer path length.

Note also that prefixes can be formed in other ways than concatenating the prefix of a core edge router with a concatenated sequence of network identifiers. For example, a concatenated sequence of link identifiers, or interface identifiers can be used. The automated prefix delegation mechanism can thereby be used to create locators with a variable length, where the length depends on the number of network entities that are traversed by the path described by the locator. Alternatively, the automated prefix delegation mechanism can be used to create fixed length locators, such as IPv4 or IPv6 addresses. In this case, the number of network entities that are traversed by the path described by the locator is limited by the 32-bit or 128-bit address field for IPv4 or IPv6 addresses respectively. If the locator requires fewer bits than the size of a fixed address field, the remaining bits in the address field must be encoded with a "not in use" bit pattern.

As described above, the parent network advertises its own prefix to the directly attached child networks, and the child networks form their own prefixes by appending their identifiers. Alternatively, a parent network can construct a prefix for each directly attached child network and advertise it to the child network. The child network then decides whether it should use this prefix based on the distance vector routing advertisement associated with the prefix advertisement. The following description assumes only that the child networks form their own prefixes, but the second alternative is equally important, and the invention described below could equally be applied to an embodiment in which the parent network constructs prefixes for each directly attached child network.

Figure 2:
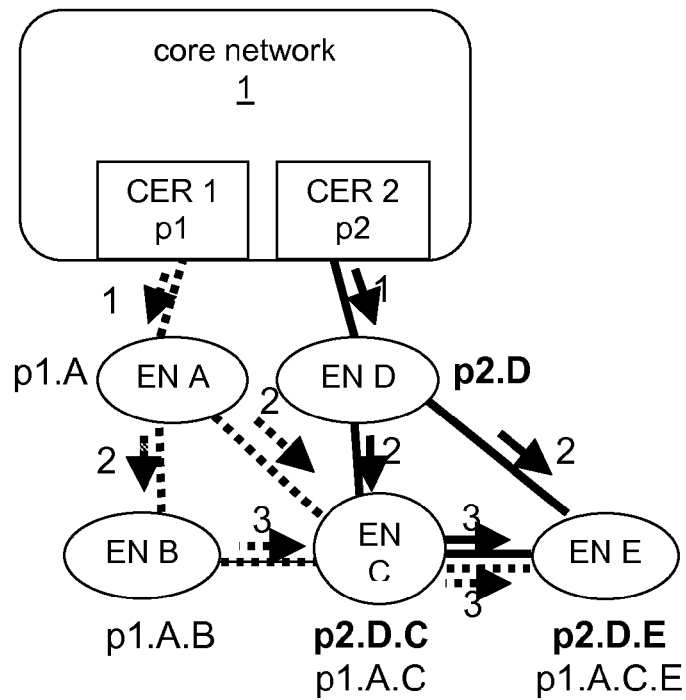
FIG. 2: illustrates schematically in a block diagram a network architecture and distance vector routing combined with automated prefix delegation where more than one policy is applied to network traffic according to an embodiment of the invention.

The integrated routing and prefix delegation scheme can be extended to an arbitrary number of policy classes. FIG. 2 shows distance vector routing with two policy classes (illustrated by a solid line and a broken line). An EN and a link between two ENs can support one or both of the policy classes. EN E receives routing messages for both policy classes, and detects that the shortest path to the core network for policy class 1 is via network D, and for policy class 2 is via network C. Using these received routing advertisements, EN E then constructs prefix p2.D.E for policy class 1, and prefix p1.A.C.E for policy class 2 (prefixes for policy class 1 are indicated in bold in the figure). If EN E has policy requirements, then it can select the path based on policy by selecting a prefix that supports a specific policy class. If no policy requirements are in place, then EN E will typically select a prefix corresponding to the shortest path (p2.D.E in this case).

Examples of policy classes include QoS classes, such as a low-delay class, a high bandwidth class, or a high reliability class. Policy classes can also be defined based on preferred providers, available network services, cost of network provider or other criteria.

To perform end-to-end routing, the paths to the core network that are optimal from a policy point of view are found both for the source and the destination network entities. The path from the source network entity to the core network is encoded in a source locator, and the path from the core network to the destination network entity is encoded in a destination locator. Forwarding from the source host to the core network is based on the source locator. Forwarding across the core network, and from the core network to the destination host, is based on the destination locator.

FIG. 2 illustrates the example of finding a path between the core network and a host where all the traversed links and network entities fulfil a specific policy class criterion. There is an AND-condition on the policy classes supported by the entities along a path in the sense that they all must support a policy class in order for the complete path to support the same class. This scenario is termed AND-routing.

Other policy routing criteria could be of interest. For example, consider the case where the path must traverse at least one network that supports a specific data encoding service. In this case there is an OR-condition of the policy classes of the entities along the path (as only one of the traversed network entities must be able to perform the encoding service, it is not necessary for all of the traversed entities to have this capability). The term OR-routing is used for this scenario. Distance vector policy routing advertisements from a core network supports not only AND-routing, but also OR-routing in a straightforward manner as illustrated in FIG. 3.

Figure 3:
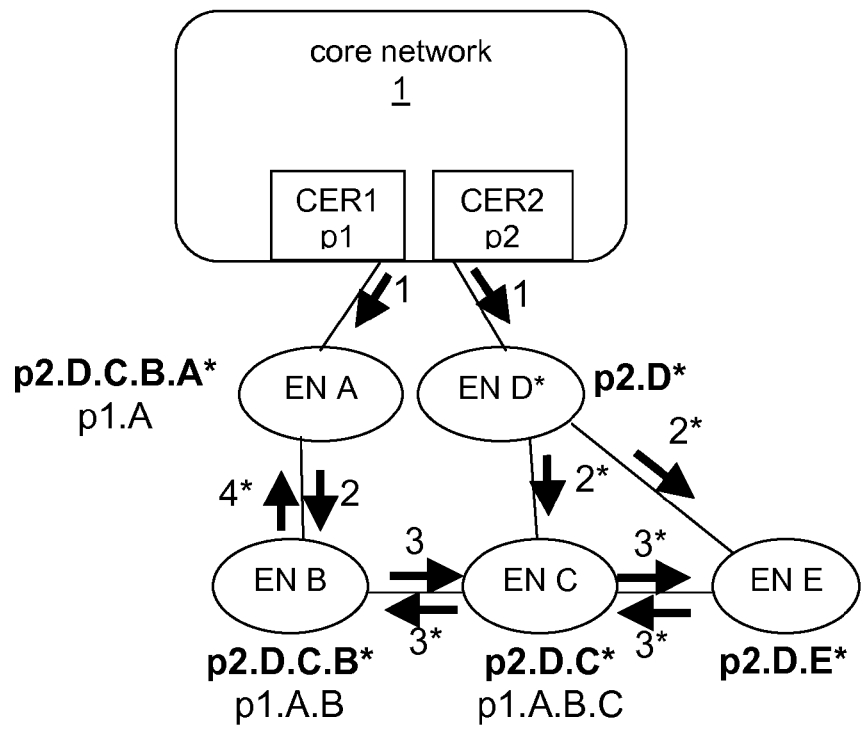
FIG. 3 illustrates schematically in a block diagram a network architecture and distance vector routing combined with automated prefix delegation where a policy requires that one network having a specific capability is traversed according to an embodiment of the invention.

EN D has a special capability, such as an encoding capability, denoted in FIG. 3 by an asterisk (*). To use the *-capability, it is sufficient to traverse only one network supporting this capability, OR-routing can be applied. All distance vector routing advertisements from EN D indicate the *-capability (indicated with a * after the hop count and the prefixes in FIG. 3). For example, EN B receives a hop count of 3 for the path to the core network having the *-capability, and a hop count of 2 for the regular path.

Prefixes are assigned to an EN for each policy class in the same fashion as for AND-routing, as shown in FIG. 3. Prefixes that correspond to the *-capability are indicated in bold in the figure.

A network entity that supports the *-capability can also support regular traffic that does not need the *-capability. Therefore, there is only a need to send separate advertisements for paths that do not have the *-capability when such paths have a lower hop count to the core network. For example, EN E does not have a shorter path to the core network than the ones that traverse *-capable EN D, and therefore EN E only receives routing advertisements that indicate this capability (from EN C and EN D). Since EN D advertises the lowest hop count, it will be the preferred next hop network when sending traffic from EN E, both for traffic that require the *-capability and for regular traffic.

Another policy condition that may be required is termed NOT-routing. Assume a path with network hops 1 . . . i . . . n along the path, and policies P1 . . . Pi . . . Pn associated with the respective hops. A policy routing class can specify that the policies Pi along the path shall NOT be equal to a specific policy Px. At a specific network hop i, this condition can be expressed as NOT(Pi EQUALS Px). A node at network hop i only forwards a distance vector routing advertisement for the policy routing class to its neighbours if the NOT condition is true. NOT-routing is used to prevent paths being advertised for traffic where it is required to send traffic via networks that do not apply specific policies. For example, it may be desirable to route packets via a path that avoids networks with specific restrictions.

Figure 4:
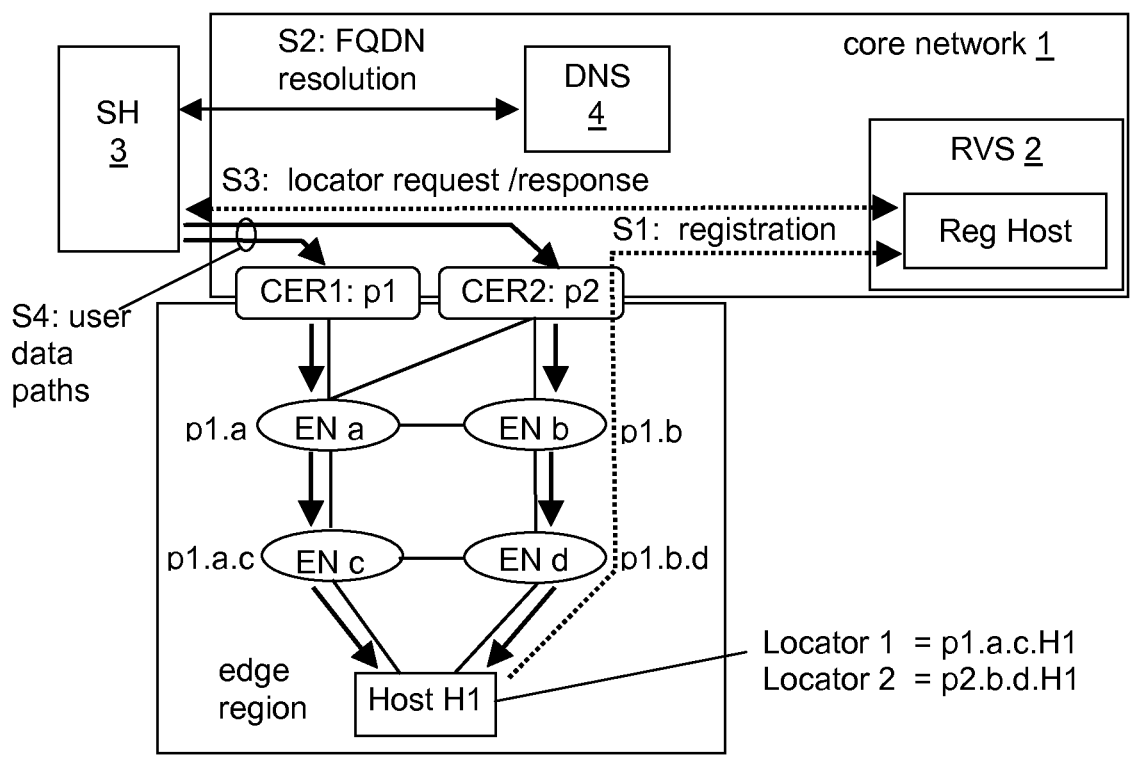
FIG. 4 illustrates schematically a network architecture and signalling to obtain a network entity locator according to an embodiment of the invention.

Referring to FIG. 4, policy routing and prefix delegation mechanism can be used to support mobility and multi-homing in networks that have a dynamic edge topology. A rendezvous system (RVS) 2 supports network entity reachability. Network entities (in this example, Host H1) register their current locators with the RVS 2 (step S1 in FIG. 4). When a source host 3 initiates a session, it first queries DNS 4 to resolve the FQDN of the destination network entity H1. DNS returns an address and a key to the RVS that are specific for the destination host (S2 in FIG. 4). The source host 3 then queries (S3) the RVS 2 for the current path-based locator of the destination host H1. Using the returned locator, the source host 3 can now send a session initiation packet to the destination host (step S4).

A locator may become invalid during an on-going session due to a topology change in the network. A router that detects that a locator in a packet header is inconsistent with currently registered neighbours returns an error message to the source host 3. The source host 3 then switches to a different locator, or requests a new locator from the RVS 2.

Using previous art for separating the host identity from its locators, such as the Host Identity Protocol, RFC 4423, May 2006, transport and application layer session continuity can be maintained in the event of locator changes The automated prefix delegation procedure described above can be used for protection against denial of service (DoS) attacks. When a DoS attack is detected on a specific link, the prefixes delegated across that link are changed to a new prefix that is not used by the current packet flows. Furthermore, packet forwarding based on the old prefixes is inhibited. As a consequence, once the DoS attack has been detected, no traffic will be forwarded on the link, except such signalling packets that are routed along the default path to the core network. The loss of end-to-end connectivity is detected by the network entities that are trying to communicate, which request a new locator from the RVS 2 based on the new prefixes. The RVS or an Attachment Register (see below) of the destination host H1 verifies the credentials of the source host 3 making the request for a new global locator for the destination host H1. If the credentials are accepted, a new locator is sent to the source host 3. The communication between the network entities can now be resumed using the new locator. The disruption of the communication between two hosts has the same duration as for any other topology change that requires a locator update, e.g. a regular mobility event or a re-homing event for a multi-homed host or network.

The end-to-end policy routing is performed using the source and destination locators derived from the prefixes as described above. End-to-end policy routing can be divided into the three problems of finding a path across the edge region of the source host, across the core network, and across the edge region of the destination host. The path from the source host 3 to the ingress of the core network 1 is encoded in the source locator. Similarly, the path from the egress of the core network 1 to the destination host H3 is encoded in the destination locator. The path across the core network 1 depends on the Core Edge Router prefixes of the source and destination locators. Packets are forwarded in a connectionless fashion without any per host or per session network state in all cases.

Using a source locator for forwarding across the edge region of the source host 3 implies that a forwarding path will traverse a core edge router encoded in the source locator. Obviously, the use of a path that always traverses a core edge router sometimes results in a non-optimal end-to-end path, since a shorter path may exist within the edge region. Such a path can be found by selecting source and destination locators that describe paths that intersect within the edge region. Packet forwarding is then based on the source locator before the intersection is reached, and based on the destination locator after the intersection.

Figure 5:
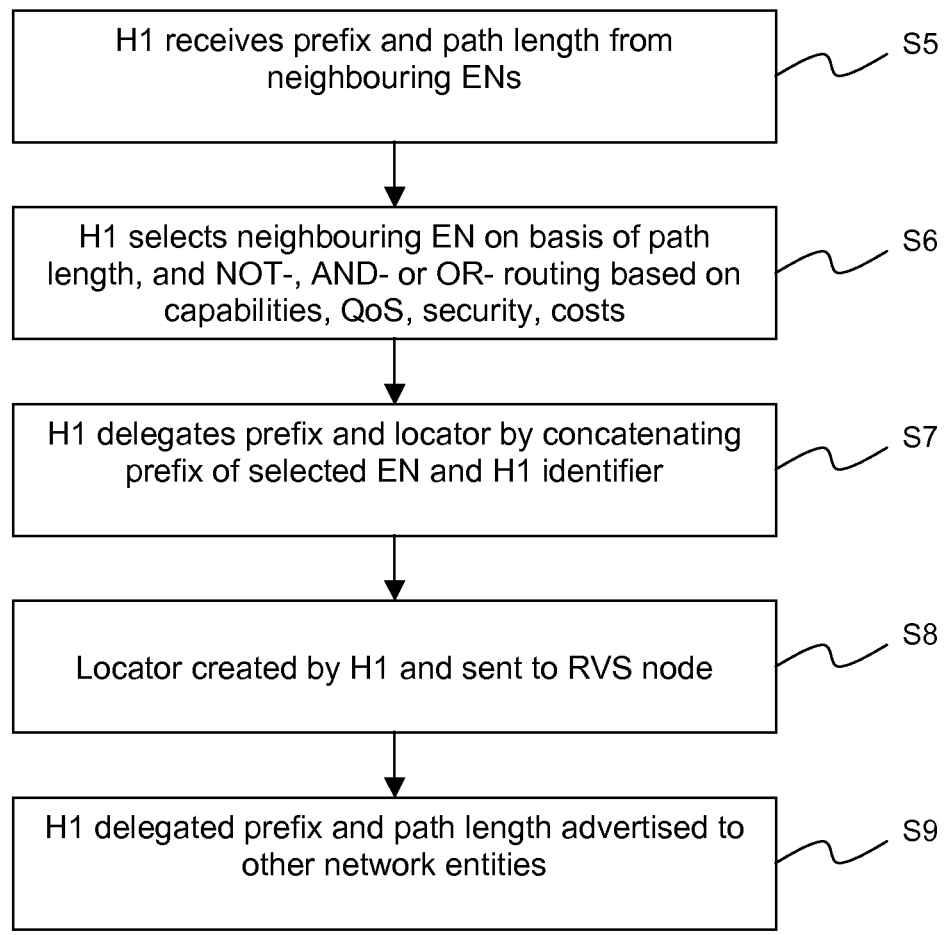
FIG. 5 is a flow diagram showing steps for delegating a prefix according to an embodiment of the invention.

Some steps of the first embodiment are summarized in FIG. 5. In this example, a prefix is being delegated for H1, with the following numbering corresponding to the numbering of FIG. 5:

S5. H1 receives a prefix and path length to the core network from each neighbouring EN, EN c and EN d.

S6. H1 selects a neighbouring EN using the criteria described above: path length, capabilities, security policies, QoS policies, network costs etc. The path may be selected on the basis of AND-, OR- and NOT-routing.

S7. H1 creates a prefix and a locator by concatenating its own identifier with the prefix of the selected EN.

S8. H1 registers its locator with the RVS.

S9. If any nodes were to go through H1 to reach the core network, H1 advertises its prefix and path length to those nodes.

Figure 6:
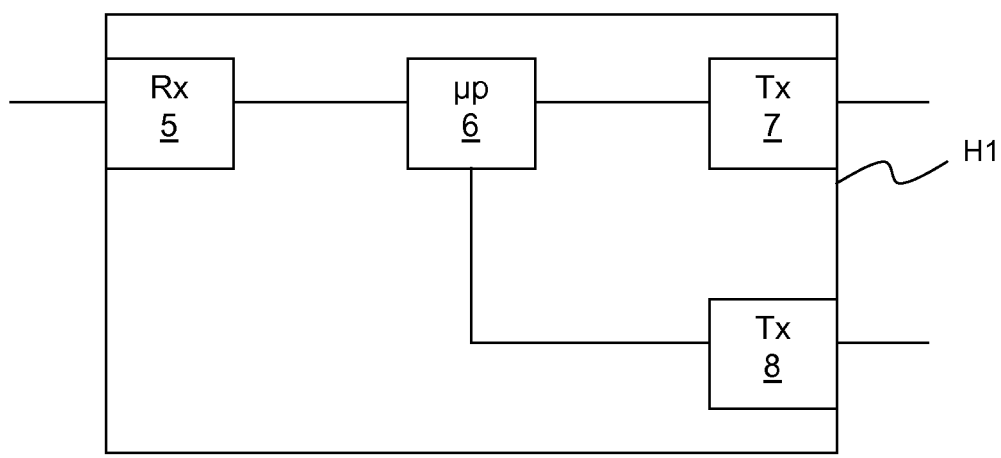
FIG. 6 illustrates schematically in a block diagram a network node according to an embodiment of the invention.

FIG. 6 shows a network node according to an embodiment of the invention. In this example, the network node is H1. H1 is provided with a receiver 5 for receiving, from EN c and EN d, the prefixes and path lengths of EN c and EN d. A processor 6 is provided for selecting an EN to use, as described above, and for delegating a prefix to H1 by concatenating H1's locator with the prefix of the selected EN. A first transmitter 7 is used to send the delegated prefix for H1 to the RVS 2, and a second transmitter 8 is used for network nodes that must advertise their prefix and path length to other neighbouring network entities. Note that the second transmitter may be physically embodied as with the first transmitter.

Figure 7:
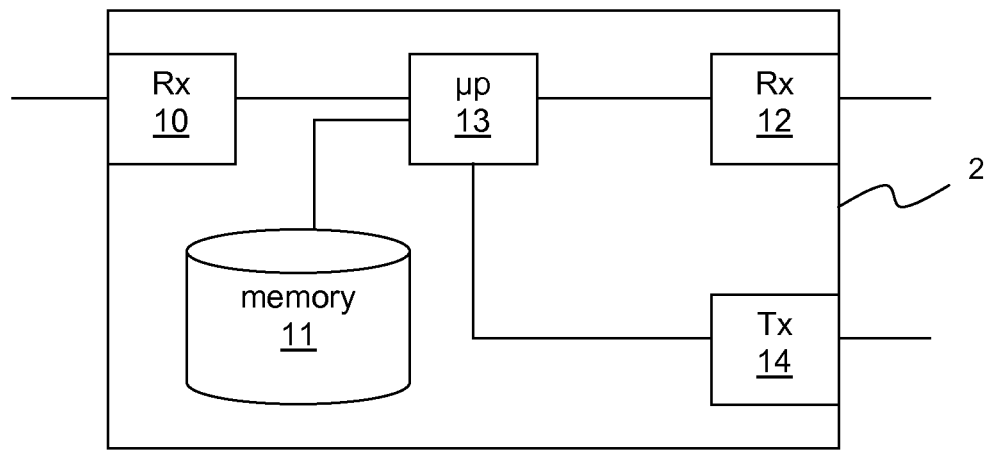
FIG. 7 illustrates schematically in a block diagram a Rendezvous System node according to an embodiment of the invention.

FIG. 7 illustrates an RVS node 2, which has a first receiver 10 for receiving registration messages from network entities that include the prefixes for those entities delegated as described above. A memory 11 is provided for storing the delegated prefixes. A second receiver 12 receives from the SH 3 a request for the prefix of a network entity such as H1, and a processor 13 is used to obtain the prefix and generate a response message. A transmitter 14 sends the response back to the SH 3.

In a second specific embodiment of the invention, prefix delegation makes use of Attachment Registers. The idea described above provides a mechanism for delegation of prefixes in an arbitrary edge topology based on policy routing criteria. Whenever a prefix is changed at the top of the hierarchy, all network entities attached to the child networks update their locators based on the new prefixes. After updating a locator, each network entity registers the new locator with its register in the RVS 2. In case of a large edge network with hundreds of thousands of network entities, a prefix change at the top of the edge network hierarchy results in a storm of registration messages from the network entities affected by the prefix change to the RVS 2. The RVS 2 and the edge network must therefore be over dimensioned to handle this storm of registration messages, which makes the system more expensive.

Figure 8:
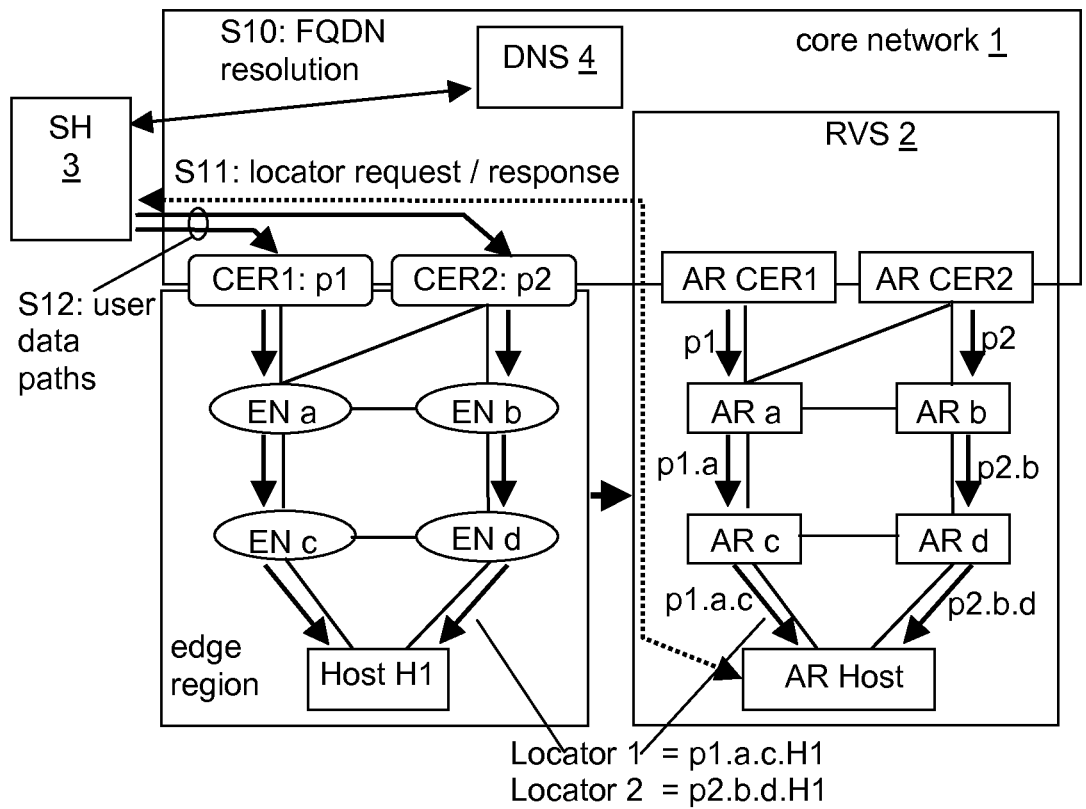
FIG. 8 illustrates schematically a network architecture and signalling to obtain a network entity locator where Attachment Registers are used to locate network entities according to an embodiment of the invention.

Referring to FIG. 8, network entities such as hosts, edge networks, and core edge routers (referred to as edge entities below) each have an associated Attachment Register (denoted by the prefix AR in FIG. 8), which is stored in the RVS 2. ARs are located in fixed networks and can be reached with static locators. An edge entity registers its directly attached neighbours with its associated AR. The ARs thus store logical links between each other, which correspond to the real links in the edge topology. A core edge router also registers its prefixes with its AR. When all edge entities have performed the registration with their respective ARs, the complete internetwork topology information of an edge region, including the internetwork link state, can be retrieved from the collection of ARs.

Based on the topology information stored among the ARs, policy routing can now be performed to support automated prefix delegation within the RVS 2. The same policy routing and automated prefix delegation mechanisms as described for the first specific embodiment are mirrored within the RVS 2. As shown in FIG. 8, the same prefix as for an edge entity is delegated to an AR associated with this edge entity. For example, prefix p2.b.d is delegated to EN d by the automated prefix delegation mechanism operating within the edge region. This is mirrored by the automated prefix delegation system operating within the RVS 2, which delegates the same prefix to the AR of EN d. Similarly, based on the registered prefixes in the ARs of the RVS 2, the locator of host H1 is delegated to the AR of host H1.

After delegating the host locators to the ARs of the hosts in the RVS as described above, the session initiation procedure is the same as for the first specific embodiment. When a source host 3 initiates a session, it first queries (S10) DNS 4 to resolve the FQDN of the destination host H1. DNS returns an address and a key to the RVS 2 that are specific for the destination host. The source host 3 then queries (S11) the RVS 2 for the current path-based locator of the destination host H1. Using the returned locator, the source host can now send (S12) a session initiation packet to the destination host H1.

A locator may become invalid during an on-going session due to a topology change. A router that detects that a locator in a packet header is inconsistent with the currently registered neighbours returns an error message to the source host 3. The source host 3 then has the option to switch to a different locator, or to request a new locator from the RVS 2.

In the case of a large edge network with hundreds of thousands of network entities, a prefix change at the top of the edge network only results in a few update messages between the edge networks at the top of the hierarchy and their associated ARs in the RVS 2. Prefix delegation required to update the host locators in the RVS 2 is then performed within the RVS. Since the network entities such as hosts do not need to register their locators with the RVS 2, a storm of registration messages for network entity locator updates between hosts and the RVS 2 is avoided.

Figure 9:
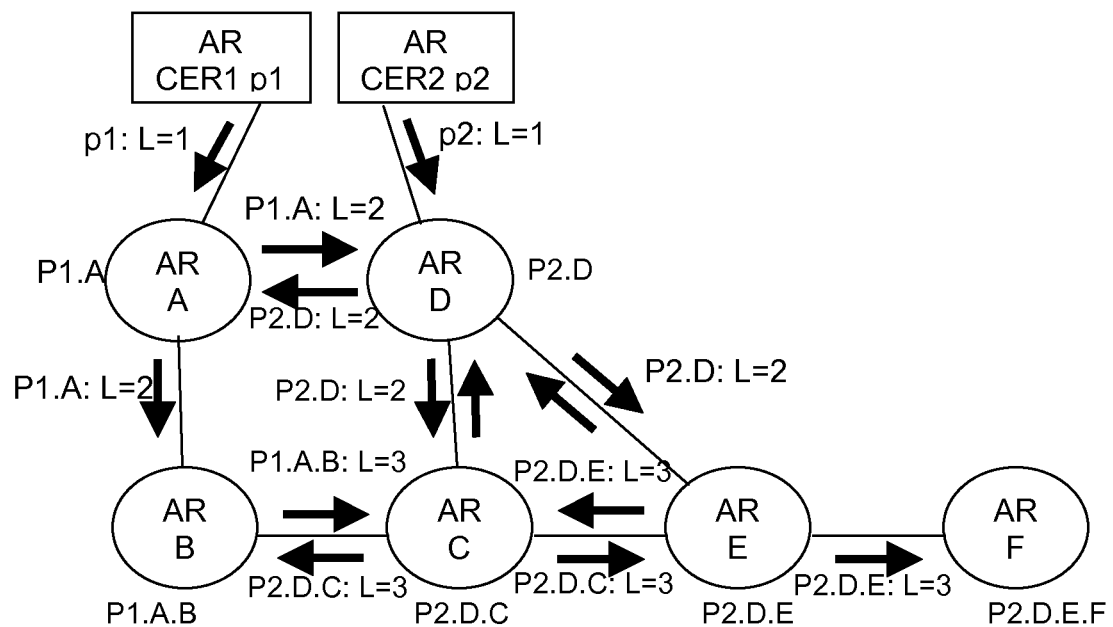
FIG. 9 illustrates schematically in a block diagram a network architecture and distance vector routing combined with automated prefix delegation among Attachment Registers according to an embodiment of the invention.

The automated prefix delegation system operating within the RVS 2 is supported by the same distance vector policy routing protocol that is operating within the edge region. For example, FIG. 9 shows the operation of the distance vector protocol among the ARs. This figure illustrates the same principle as that illustrated in FIG. 1, but here this principle is applied to the ARs in the RVS 2. FIG. 9 therefore shows the operation of the routing protocol among the ARs of the edge entities, instead of the operation between the edge entities themselves. The principle of operation of the distance vector policy routing protocol within the RVS 2 is identical to the principle of operation in the edge region described for the first specific embodiment.

When the automated prefix delegation mechanism is mirrored in the RVS 2, there are two design alternatives for the edge region, either with or without prefix delegation. In a scenario in which prefix delegation is implemented in the edge region, every network entity is aware of its own locator as soon as the automated prefix delegation procedure is completed in the edge region. A source host can then directly insert its locator in the source address field of any packet it sends. The destination locator is retrieved from the RVS 2 as described above.

On the other hand, to reduce the complexity of the edge region, it may be desirable to implement the automated prefix delegation mechanism in the RVS 2 only. In this case a source host 3 must query the RVS 2 both for its own locator and for the destination locator before sending a session initiation message. This imposes a delay on the session initiation. To reduce this delay, a host can cache its own locator. The cache is cleared when a topology change among the parent networks is detected that affects the prefixes, and in turn the host locator.

Policy routing and prefix delegation in arbitrary dynamic topologies are complex tasks. However, the invention described above transforms this problem into the problem of encoding the path to the core network for the source and for the destination in a set of prefixes using a simplistic distance vector policy routing protocol. This results in a simplistic and scalable support for host and network mobility and multihoming. The support is based on a native routing and addressing mechanism that allows for the assignment of a topologically significant locator to a mobile or multi-homed host. In addition, a topologically significant locator is also assigned for hosts that are attached to moving or multi-homed networks. The change of locator of a mobile host can be hidden from the transport and upper layers by means of a host identity and locator split mechanism, reducing the need for add-on mechanisms such as Mobile IP.

Network state for routing and forwarding is only needed to find a path to the core network, and to the directly attached neighbours, compared to traditional routing solutions where all networks send route advertisements to all other networks. These traditional solutions introduce a substantial amount of routing and forwarding state in the edge networks. As a consequence, the time needed to update this routing state in case of a topology change is of the order of seconds, or even tens of seconds. In addition, the routers must have a substantial processing capacity to handle the routing update signalling. By contrast, the present invention allows for minimal amount of routing state, which leads to a shorter routing convergence time, and the processing capacity needed in the routers to handle route updates is reduced compared to traditional solutions. By using Attachment Registers, the mirroring of the automated prefix delegation system within the RVS 2 allows for better scalability characteristics. The RVS 2 does not need to handle a storm of network entity locator registration messages, where a prefix change occurs.

It will be appreciated by the person of skill in the art that various modifications may be made to the above-described embodiments without departing from the scope of the present invention.

The following abbreviations have been used in this description:
AR Attachment Register
CER Core Edge Router
DNS Domain Name System
EN Edge Network
FQDN Fully Qualified Domain Name
RVS Rendezvous System
SH Source Host

The invention claimed is:

1. A method of prefix delegation for a network entity in a communication network, the method comprising:
- at a network entity, receiving from a first neighbouring network entity a first prefix, said first prefix relating to said first neighbouring network entity, and a path length to a core network entity via said first neighbouring network entity;
- at the network entity, receiving from a second neighbouring network entity a second prefix, said second prefix relating to said second neighbouring network entity, and a path length to a core network entity via said second neighbouring network entity;
- selecting a neighbouring network entity on the basis of the path length to the core network entity; and
- delegating a prefix for the network entity by concatenating the prefix of the selected neighbouring network entity with an identifier for the network entity.

2. The method according to claim 1, further comprising sending to a core network node the delegated prefix for the network entity.

3. The method according to claim 1, further comprising:
- calculating a path length from the network entity to the core network entity; and
- sending to a further neighbouring network entity the delegated prefix and the calculated path length.

4. The method according to claim 1, further comprising:
- receiving at the network entity from one of the first and second neighbouring network entities information relating to properties of the neighbouring network entity; and
- selecting a neighbouring network entity is further performed on the basis of the received information.

5. The method according to claim 4, wherein the information relating to properties is selected from capabilities of the neighbouring network entity, security policies used by the neighbouring network entity, Quality of Service policies used by the neighbouring network entity, and/or charges associated with the neighbouring network entity.

6. The method according to claim 5, wherein the capabilities of the neighbouring network entity are selected from encryption, decryption, admission control, transcoding, packet classification and filtering, address translation, proxy functions, cache functions, application layer gateway functions, firewall functions, and/or packet marking and scheduling capabilities.

7. The method according to claim 4, further comprising selecting the neighbouring entity on the basis that a path from the network entity to the core network entity traverses either at least one of, all of, or none of the network entities having predetermined properties.

8. The method according to claim 1, wherein the delegated prefix comprises a concatenation of identifiers for each network entity in a path between the network entity and the core network entity and a prefix of the core network entity.

9. The method according to claim 8, each individual prefix is stored in an Attachment Register at an Attachment Register function, the individual prefixes being individually updatable in the event that the prefix for the associated network entity changes.

10. The method according to claim 1, wherein the network entity is selected from a source host, a destination host, and/or an edge network.

11. A network entity for use in a communication network, the network entity comprising:
- a receiver configured to receive from a first neighbouring network entity a first prefix, said first prefix relating to said first neighbouring network entity, and a path length to a core network entity via said first neighbouring network entity, the receiver further configured to receive from a second neighbouring network entity a second prefix, said second prefix relating to said second neighbouring network entity, and a path length to a core network entity via said second neighbouring network entity;
- a processor configured to select a neighbouring network entity on the basis of the path length and to delegate a prefix for the network entity by concatenating the prefix of the selected neighbouring network entity with an identifier for the network entity; and
- a first transmitter configured to send to a core network node the delegated prefix for the network entity.

12. The network entity according to claim 11, further comprising a second transmitter configured to advertise the delegated prefix and a path length to the core network node to further neighbouring network entities.

13. A Rendezvous System node for use in a communication network, the Rendezvous System node comprising:
- a first receiver configured to receive a registration message from a first network entity, the registration message including a delegated prefix for the first network entity, the delegated prefix comprising a concatenation of identifiers for network entities in a path between the first network entity and a core network entity and a prefix of the core network entity;
- a memory configured to store the delegated prefix for the network entity;
- a second receiver configured to receive, from a second requesting network entity, a request for the prefix of the network entity;
- a processor configured to determine from the memory the prefix of the first network entity; and
- a transmitter configured to send a message to the second requesting network entity, the message including the delegated prefix.

14. The Rendezvous System node according to claim 13, wherein an individual prefix for each network entity is individually updatable in the event that the prefix for the associated network entity changes.

15. A computer program product on a tangible non-transitory computer readable storage medium and configured to control a network entity to perform the method as claimed in claim 1.

* * * * *

UNITED STATES PATENT AND TRADEMARK OFFICE
CERTIFICATE OF CORRECTION

PATENT NO. : 8,537,804 B2  
APPLICATION NO. : 13/057264  
DATED : September 17, 2013  
INVENTOR(S) : Eriksson Page 1 of 1

It is certified that error appears in the above-identified patent and that said Letters Patent is hereby corrected as shown below:

On Title Page 2, in Item (56), under "OTHER PUBLICATIONS", in Column 1, Line 4, delete "ieee.orq/" and insert -- ieee.org/ --, therefor.

Signed and Sealed this
Fifteenth Day of April, 2014

Michelle K. Lee
*Deputy Director of the United States Patent and Trademark Office*